US008479401B2

(12) United States Patent
Barkley

(10) Patent No.: US 8,479,401 B2
(45) Date of Patent: Jul. 9, 2013

(54) POWER TOOL WITH VIRTUAL PIVOT

(75) Inventor: Andrew Stuart Barkley, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 12/816,286

(22) Filed: Jun. 15, 2010

(65) Prior Publication Data

US 2011/0302794 A1 Dec. 15, 2011

(51) Int. Cl.
*B23D 45/16* (2006.01)
*B23D 47/02* (2006.01)
*B27B 9/02* (2006.01)

(52) U.S. Cl.
USPC .......................... 30/376; 30/391

(58) Field of Classification Search
USPC .................. 30/374, 375, 376, 377, 388, 390, 30/391
See application file for complete search history.

(56) References Cited

U.S. PATENT DOCUMENTS

| | | | | | |
|---|---|---|---|---|---|
| 1,830,350 | A | * | 11/1931 | Crowe | 30/376 |
| 1,830,579 | A | * | 11/1931 | Wappat | 30/391 |
| 3,262,472 | A | * | 7/1966 | McCarty et al. | 30/376 |
| 3,799,224 | A | * | 3/1974 | Vizziello et al. | 144/133.1 |
| 4,290,464 | A | * | 9/1981 | Marsan | 144/136.95 |
| 4,937,943 | A | * | 7/1990 | Nieminen | 30/376 |
| 4,982,501 | A | | 1/1991 | Sauerwein et al. | |
| 4,999,916 | A | * | 3/1991 | Sistare | 30/376 |
| 5,239,756 | A | | 8/1993 | Matzo et al. | |
| 5,271,155 | A | * | 12/1993 | Fuchs et al. | 30/376 |
| 5,285,558 | A | * | 2/1994 | Carder et al. | 26/7 |
| 5,570,511 | A | | 11/1996 | Reich et al. | |
| 5,758,425 | A | | 6/1998 | Gallagher et al. | |
| 6,574,874 | B2 | * | 6/2003 | Hartmann | 30/376 |
| 6,601,305 | B1 | | 8/2003 | Fukuoka | |
| 6,612,349 | B2 | * | 9/2003 | Smith et al. | 144/136.95 |
| 6,886,259 | B2 | | 5/2005 | Kani | |
| 7,290,342 | B2 | | 11/2007 | Hartmann et al. | |
| 7,549,229 | B2 | | 6/2009 | Aoyama et al. | |
| 2008/0172891 | A1 | * | 7/2008 | Nie | 30/376 |
| 2009/0133559 | A1 | | 5/2009 | Sargeant et al. | |

FOREIGN PATENT DOCUMENTS

| | | | |
|---|---|---|---|
| JP | 4-353401 | * | 12/1992 |

* cited by examiner

*Primary Examiner* — Hwei C Payer
(74) *Attorney, Agent, or Firm* — Maginot, Moore & Beck

(57) ABSTRACT

A power tool in one embodiment includes a motor supported by a frame, a foot defining a first plane, a first guide fixedly positioned with respect to the foot and defining a first arc in a second plane, a second guide fixedly positioned with respect to the foot and defining a second arc in a third plane, wherein the second plane and the third plane are orthogonal to the first plane and the first arc and the second arc are offset when projected onto a reference plane parallel to the second plane and the third plane, a first pin fixedly positioned with respect to the motor and guided by the first guide; and a second pin fixedly positioned with respect to the motor and guided by the second guide.

18 Claims, 6 Drawing Sheets

POWER TOOL WITH VIRTUAL PIVOT

FIELD

The present disclosure relates generally to power tools and particularly to power hand tools.

BACKGROUND

Power hand tools such as miter saws, circular saws, as well as other hand tools are often provided a support member or “foot” that is placed against a work piece when using the tool. The blade usually extends through the foot structure at a location that is hidden from the view of the user. Accordingly, an indicator is provided on the foot structure that can be used to align the blade with the desired cut location of the work piece.

These hand tools are frequently provided with the capability of adjusting the bevel angle of the cut that is made with the tool. Even when performing a bevel cut, however, the foot structure rests upon the work piece while the rest of the tool is at a pivoted location with respect to the foot. Thus, in order to maintain the blade indicator aligned with the blade during a bevel cut, the pivot axis for these power tools is optimally defined by the intersection of the plane defined by the saw blade and the plane defined by the foot of the tool.

Placement of a pivot at the intersection of the saw blade and the foot of the tool, however, is not possible. Accordingly, some power tools incorporate a virtual pivot point which is defined by a pin which rides within an arc-shaped guide slot. In order to provide desired stability, one pin and guide slot arrangement is provided at the front portion or quadrant of the power tool while a second pin and guide slot arrangement is provided at the rear quadrant of the power tool. Locking mechanisms are provided for the front and rear guide slot arrangements to lock the pins at the desired locations within the guide slots.

While the above described pin and guide slot arrangement is effective in defining a virtual pivot point at the intersection of the saw blade and the foot of the tool, the pin and guide slot arrangement exhibits various shortcomings. One shortcoming of a pin and guide slot arrangement is that the tool becomes unstable once one of the locking mechanisms is unlocked. Specifically, once one pin is unlocked, the weight of the tool causes a torque about the pin that is still locked. Because the unlocked pin is free to move in a direction tangential to the walls of the guide slot within the guide slot, the unlocked pin moves within the guide slot unless the pin is providentially positioned such that the weight borne by the pin is directed directly into a wall of the guide slot.

Moreover, once both pins are unlocked and the tool is pivoted, any such providential alignment is necessarily destroyed. Thus, the position of the pins in the associated guide slot can become offset if care is not taken to ensure equal movement of the front and back pins. Furthermore, once a pin is locked in a pivoted position, care must be taken to prevent inadvertent movement of the unlocked pin, which will generally be in an unstable position, prior to locking the second pin. Thus, offsets between the front and rear pin and guide slot arrangements can frequently result when pivoting power tools.

Once an offset exists between the two pin and guide slot arrangements, the axis of rotation defined by the pin and guide slot arrangements is no longer aligned with the plane of the blade. If the axis of rotation is not aligned with the plane of the blade, the tool can bind as the blade makes a cut into a work piece. Since the offset described above can be subtle, an operator may not become aware of the misalignment until binding occurs.

What is needed therefore is an improved arrangement for providing a virtual pivot point for a power tool.

SUMMARY

In accordance with one embodiment of the present disclosure, there is provided a power tool which includes a motor supported by a frame, a foot defining a first plane, a first guide fixedly positioned with respect to the foot and defining a first arc in a second plane, a second guide fixedly positioned with respect to the foot and defining a second arc in a third plane, wherein the second plane and the third plane are orthogonal to the first plane and the first arc and the second arc are offset when projected onto a reference plane parallel to the second plane and the third plane, a first pin fixedly positioned with respect to the motor and guided by the first guide; and a second pin fixedly positioned with respect to the motor and guided by the second guide.

Pursuant to another embodiment of the present disclosure, there is provided a power hand tool including a motor supported by a frame, a first pin fixedly positioned with respect to the motor, a second pin fixedly positioned with respect to the motor, a first guide plate in slidable contact with the first pin and the second pin, the first guide plate pivotably connected to the frame through the first pin and the second pin, and a foot structure rigidly connected to the first guide plate.

In yet another embodiment, a power hand tool includes a foot structure defining a planar support surface, a first guide plate extending upwardly from the foot structure, a first arcuate guide slot in the first guide plate, a second arcuate guide slot in the first guide plate, a first guide supported by the first arcuate guide slot, a second guide supported by the second arcuate guide slot, and an upper portion of the tool pivotably supported by the foot structure through the first guide plate.

DESCRIPTION OF THE PREFERRED EMBODIMENTS

Figure 1:
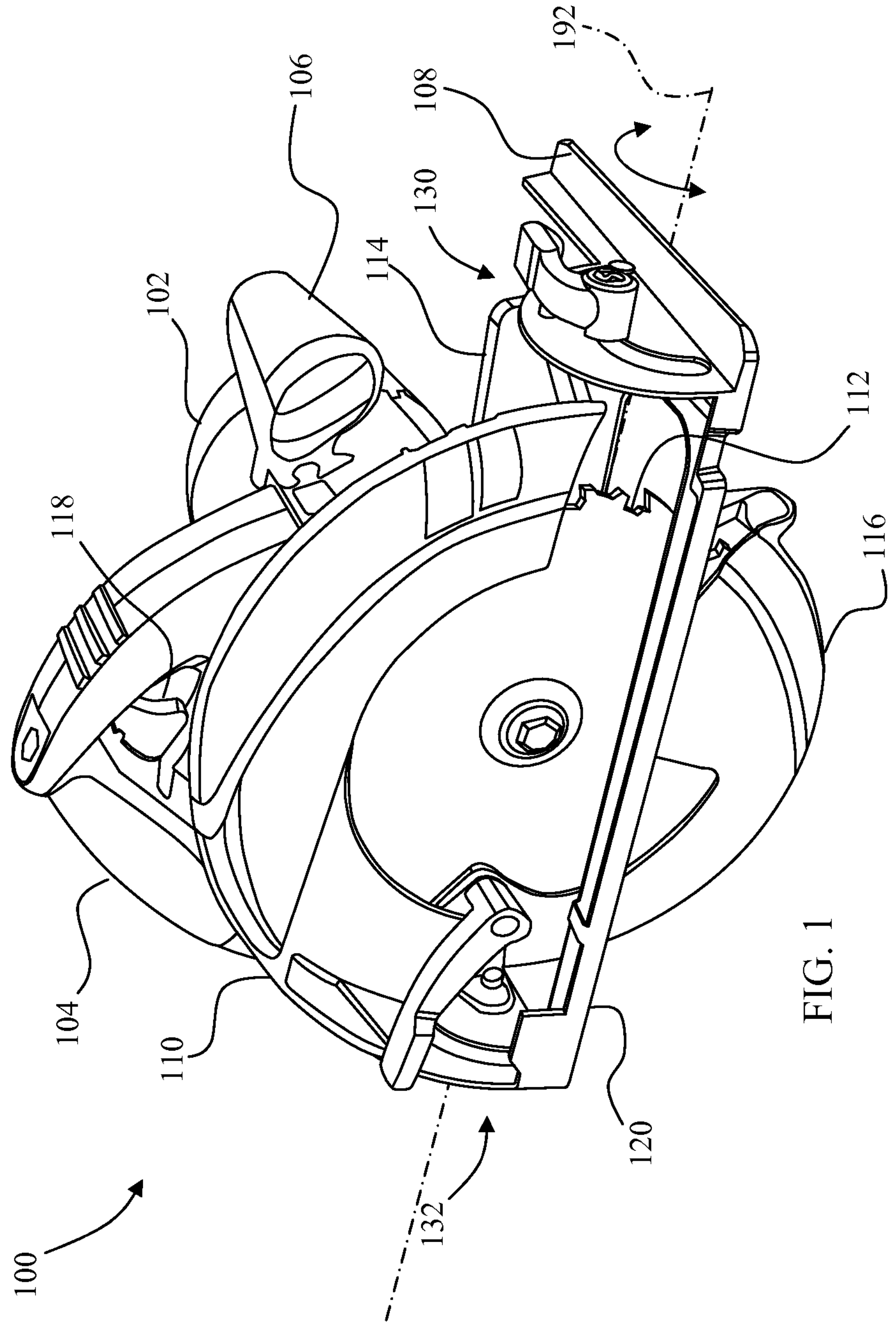
FIG. 1 depicts a perspective view of a power tool incorporating aspects of the disclosure.

Turning now to the drawings, and particularly FIG. 1, a circular saw 100 includes a motor housing 102, a handle 104, an auxiliary handle 106, a foot structure 108, and a blade housing 110 in which a saw blade 112 is located. A frame 114 supports a rotating blade guard 116 and a motor (not shown) located within the motor housing 102. The motor (not shown) is controlled by a power trigger 118 extending from the handle 104.

Figure 2:
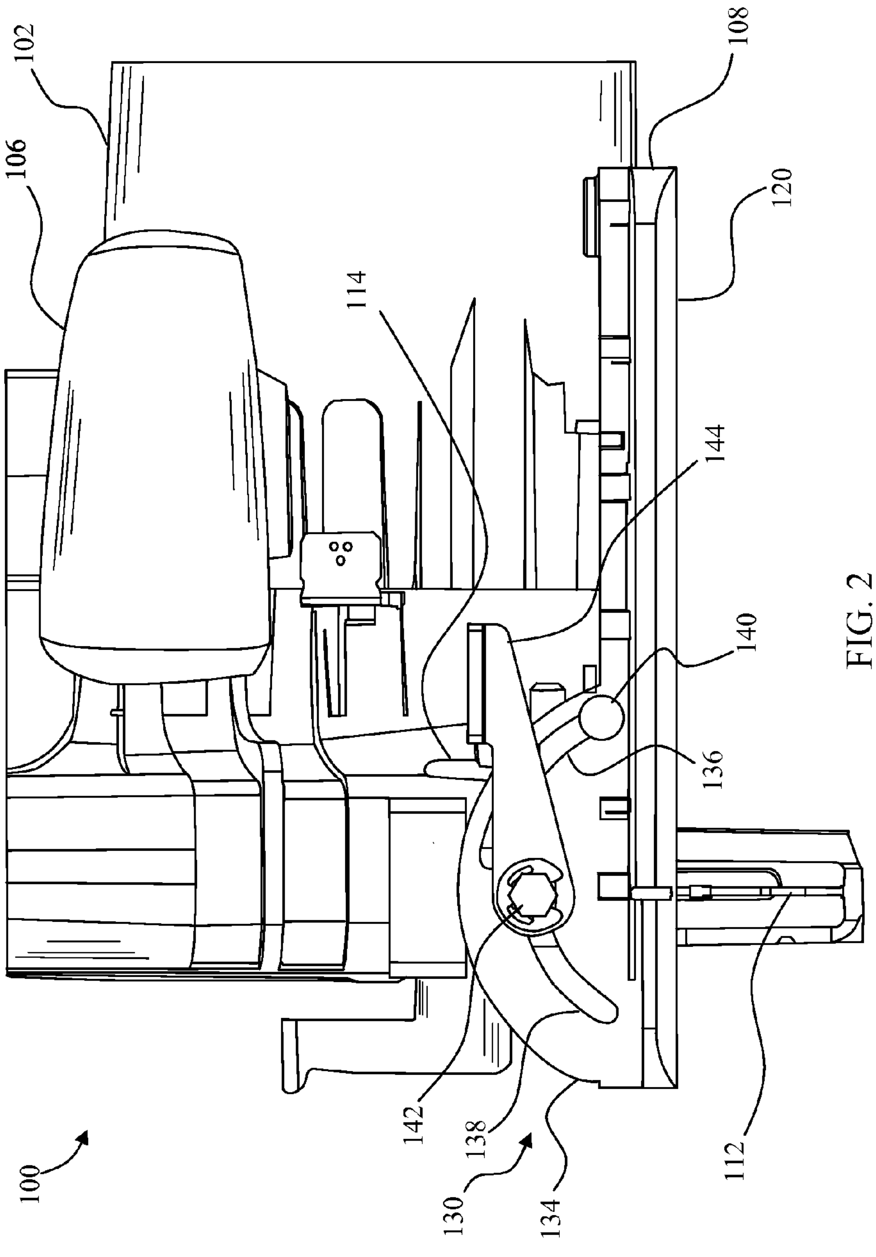
FIG. 2 depicts a partial front plan view of the power tool of FIG. 1 showing two offset guide slots in the shape of arcs in a front guide assembly used to pivotally support the upper portion of the tool of FIG. 1 above a foot structure.

The foot structure 108 includes a lower surface 120 that is substantially planar (see FIG. 2). The frame 114 is pivotally connected to the foot structure 108 by a front guide assembly 130 and a rear guide assembly 132. The foot structure 108 is referred to herein as the "lower portion" of the power tool 100 while the remaining components of the power tool 100, other than the front guide assembly 130 and the rear guide assembly 132, are generally referred to as the "upper portion" of the power tool 100.

The front guide assembly 130, shown more clearly in FIG. 2, includes a guide plate 134 with two guide slots 136 and 138 formed in the shape of arcs. Pins 140 and 142 extend through the guide slots 136 and 138, respectively. A locking mechanism 144 is associated with the pin 142. The front guide assembly 130 and the rear guide assembly 132 are mirror images of each other with the exception of the locking mechanism 144, which could be included in the rear guide assembly 132 if desired. Accordingly, while primarily the rear guide assembly 132 is described in fuller detail below, such description applies to the front guide assembly 130 which includes like components arranged in like configurations.

Figure 3:
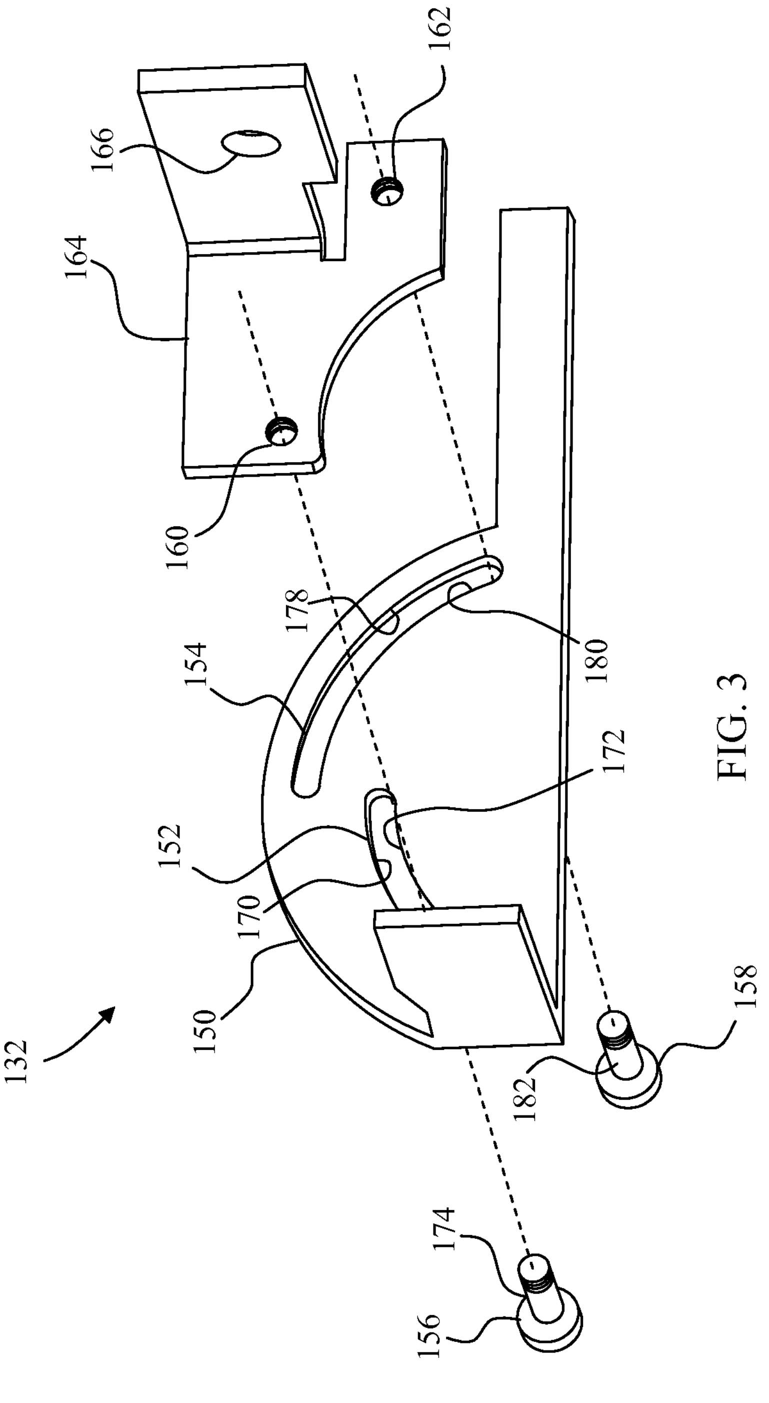
FIG. 3 depicts an exploded view of the rear guide assembly of FIG. 1.

FIG. 3 depicts an exploded view of the rear guide assembly 132. The rear guide assembly 132 includes a guide plate 150 with two guide slots 152 and 154 formed in the shape of arcs. The guide plate 150 is depicted in FIG. 3 as separate from the foot structure 108. When assembled, however, the guide plate 150 is fixedly connected to the foot structure 108 and may be integrally formed with the foot structure 108 if desired.

Two pins 156 and 158 extend through the guide slots 152 and 154, respectively. The pins 156 and 158 are threadingly engaged with threaded bores 160 and 162 in a bracket 164. If desired, a locking mechanism such as the locking mechanism 144 may be associated with one of the pins 156 and 158. The bracket 164 is fixedly attached to the frame 114 using a bolt (not shown) which extends through a bolt hole 166.

The guide slot 152 includes an upper wall 170 and a lower wall 172 which extend from the rear surface of the guide plate 150 to the front surface of the guide plate 150. The upper wall 170 and the lower wall 172 are spaced apart by a distance that is substantially equal to the diameter of a shaft 174 of the pin 156. The guide slot 154 includes an upper wall 178 and a lower wall 180. The upper wall 178 and the lower wall 180 are spaced apart by a distance that is substantially equal to the diameter of a shaft 182 of the pin 158.

Figure 4:
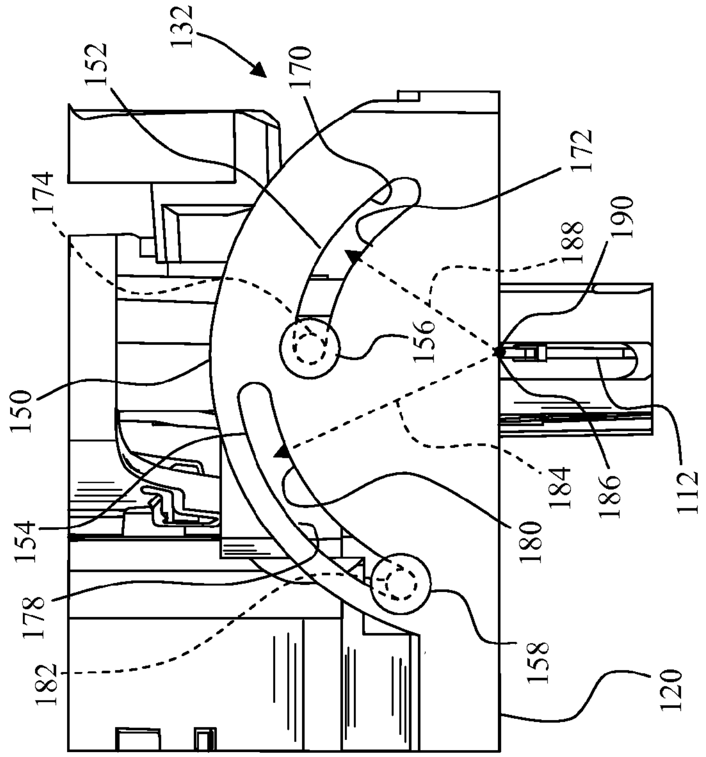
FIG. 4 depicts a partial rear plan view of the power tool of FIG. 1 showing two offset guide slots in the shape of arcs in a rear guide assembly used to pivotally support the upper portion of the tool of FIG. 1 above a foot structure.

As shown in FIG. 4, the guide slot 154 is formed along an arc having a radius 184 with an origin 186 that is located at the intersection of the plane defined by the bottom surface 120 of the foot structure 108 and the plane defined by the blade 112. The guide slot 152 is formed along an arc having a radius 188 with an origin 190 that is collocated with the origin 186. The guide slots 152 and 154 thus define a pivot axis 192 shown in FIG. 1 that is located at the intersection of the plane defined by the bottom surface 120 of the foot structure 108 and the plane defined by the blade 112. Accordingly, when the pins 156 and 158 (140 and 142) are received within the guide slots 152 and 154 (136 and 138), respectively, the upper portion of the power tool 100 can pivot about the pivot axis 192 with respect to the foot structure 108 as discussed more fully below.

Pivoting of the upper portion of the power tool 100 with respect to the foot structure 108 is accomplished by moving the locking mechanism 144 from the locked position to an unlocked position with the foot structure 108 positioned in a surface. In the embodiment of FIG. 1, this entails rotating the locking mechanism 144 in a counter clockwise direction from the horizontal position shown in FIG. 1 to a vertical position. When the locking mechanism 144 is unlocked, the upper portion of the power tool 100 is supported by the foot structure 108 through the pins 140,142, 156 and 158 as explained with reference to FIGS. 3 and 4.

With reference to the rear guide assembly 132, the weight of the upper portion of the power tool 100 is transferred by the bracket 164 to the pins 156 and 158. In the configuration of FIG. 4, the pin 156 is nested against the left end of the guide slot 152 while the pin 158 is nested against the left end of the guide slot 154. Accordingly, the downward force generated by the weight of the upper portion of the power tool 100 is passed to the lower wall 172 of the guide slot 152 and to the left end of the guide slot 154. Similarly, the pins 140 and 142 and guide slots 136 and 138 provide support at the front of the power tool 100. Thus, the upper portion of the power tool 100 is supported stably by the foot structure 108 through the front guide assembly 130 and the rear guide assembly 132 even though the locking mechanism 144 is unlocked.

Figure 5:
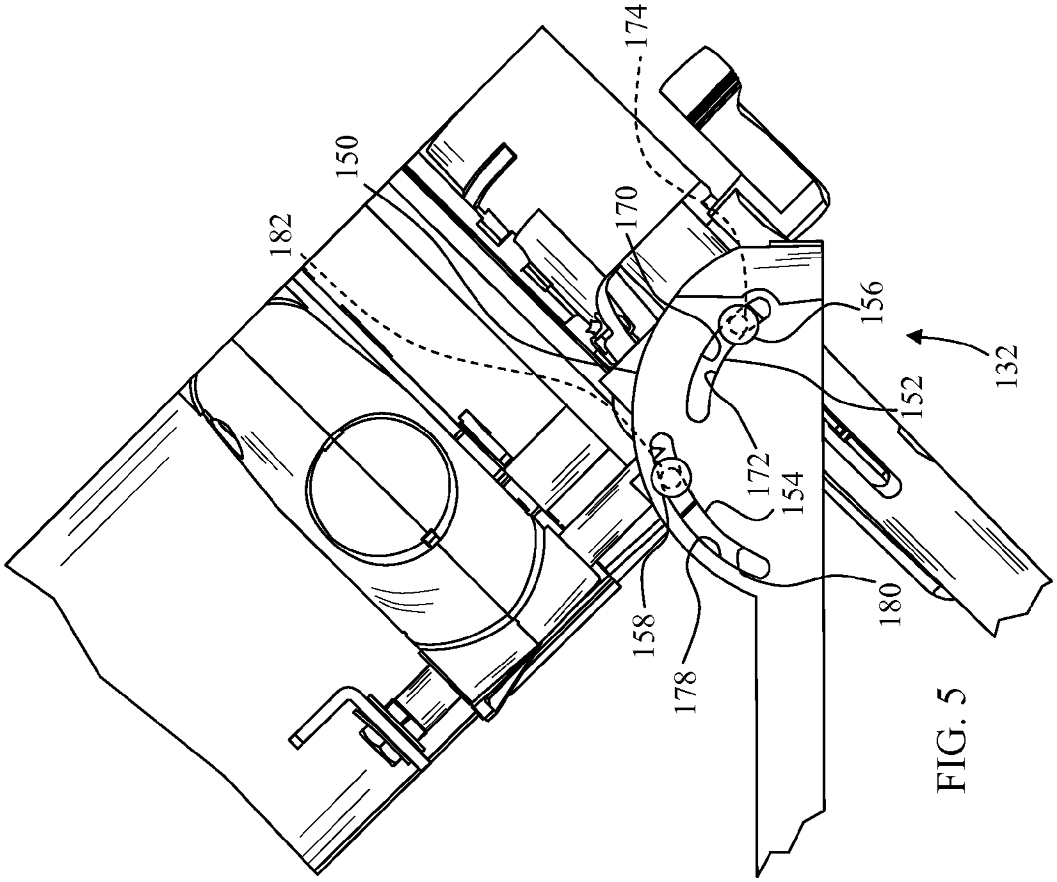
FIG. 5 depicts a partial rear plan view of the power tool of FIG. 1 showing two offset guide slots in the shape of arcs in a rear guide assembly used to pivotally support the upper portion of the tool of FIG. 1 above a foot structure when the upper portion of the tool has been pivoted.

The user then pivots the upper portion of the power tool 100 in a clockwise direction (as viewed in FIG. 4) while maintaining the foot structure 108 supported on a surface until the desired angle is obtained between the plane defined by the bottom surface 120 of the foot structure 108 and the blade 112, such as the angle depicted in FIG. 5.

Throughout the pivoting procedure, the upper portion of the power tool 100 is supported stably by the front guide assembly 130 and the rear guide assembly 132. Specifically, the weight of the upper portion of the power tool 100 on the pins 140 and 158 will have a tendency to force the pins 140 and 158 toward the lower end of the guide slots 136 and 154, respectively. Thus, if a user did not carefully balance movement of the front portion of the saw and the back portion of the saw during pivoting, one of the pins 140 or 158 would tend to lag behind the other of the pins 140 or 158 skewing the upper portion of the power tool 100 with respect to the foot structure 108.

Figure 6:
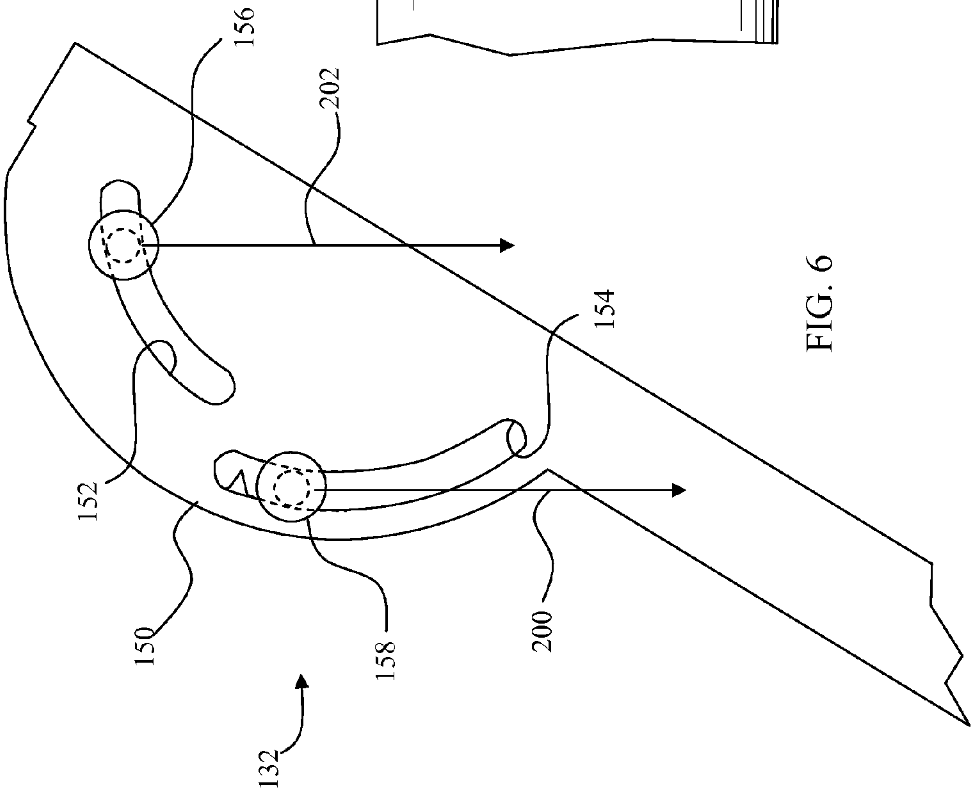
FIG. 6 depicts a simplified plan view of the rear guide assembly of FIG. 1 showing how the two pins provide stable support throughout pivoting of the upper portion of the tool of FIG. 1 above a foot structure.

Any such skewing, however, is directly opposed by the pins 142 and 158. The opposition to skewing is described with reference to FIG. 6 which is a simplified view of the rear guide assembly 132. In FIG. 6, the direction of a force from the upper portion of the tool 100 on the pin 158 tending to move the pin 158 within the guide slot 154 is depicted by the arrow 200. Because the pin 158 and the pin 156 are both rigidly attached to the bracket 164, the force applied to the pin 158 would also be applied to the pin 156 in the same direction as the arrow 200 as indicated by the arrow 202.

Thus, while the pin 158 is free to move within the guide slot 154 in the direction of the arrow 200, the lower wall 180 of the guide slot 154 precludes movement of the pin 156 in the direction of the arrow 202. The same effect is realized at the front guide assembly 130. Moreover, at angles between the angle depicted in FIG. 4 and the angle depicted in FIG. 5, the pins 156 and 158 and guide slots 152 and 154 are configured such that lateral movement of either pin 156 or 158 within the respective guide slot 152 or 154 is directly opposed by the contact of the other of the pins 156 or 158 against the respective lower wall 172 or 180 of the respective guide slot 152 or 154. Thus, regardless of the angle formed between the bottom 120 of the foot structure 108 and the blade 112, the upper portion of the tool 100 is stably supported by the front guide assembly 130 and the rear guide assembly 132.

The foregoing example describes pivoting of the upper portion of the tool 100 with respect to the foot structure 108. In some circumstances, however, a user may hold the power tool 100 by the handle 104 and pivot the foot structure 108. In such circumstances, the upper portion of the power tool 100 is used to support the foot structure 108 through the front guide assembly 130 and the rear guide assembly 132. In this situation, the front guide assembly 130 and the rear guide assembly 132 also stably support the foot structure 108 as described below.

Pivoting of the foot structure 108 with respect to the upper portion of the power tool 100 is accomplished by moving the locking mechanism 144 from the locked position to an unlocked position as described above. Once the locking mechanism 144 is unlocked, the foot structure 108 is supported by the upper portion of the power tool 100 through the pins 140,142, 156 and 158 as explained with reference to FIGS. 3 and 4.

Specifically, the weight of the foot structure 108 is transferred by the pins 156 and 158 to the bracket 164. In the configuration of FIG. 4, the pin 156 is nested against the left end of the guide slot 152 while the pin 158 is nested against the left end of the guide slot 154. Accordingly, the downward force generated by the weight of the foot structure 108 will have a tendency to move the foot structure 108 downwardly away from the pins 156 and 158. The guide slot 154 provides minimal resistance to such movement in the configuration of FIG. 4. The upper wall 170 of the guide slot 152, however, is directly above the shaft 174 of the pin 156. The same effect is realized at the front guide assembly with the pin 142 within the slot 138. Accordingly, the foot structure 108 is stably supported at both the front portion and the rear portion.

Figure 7:
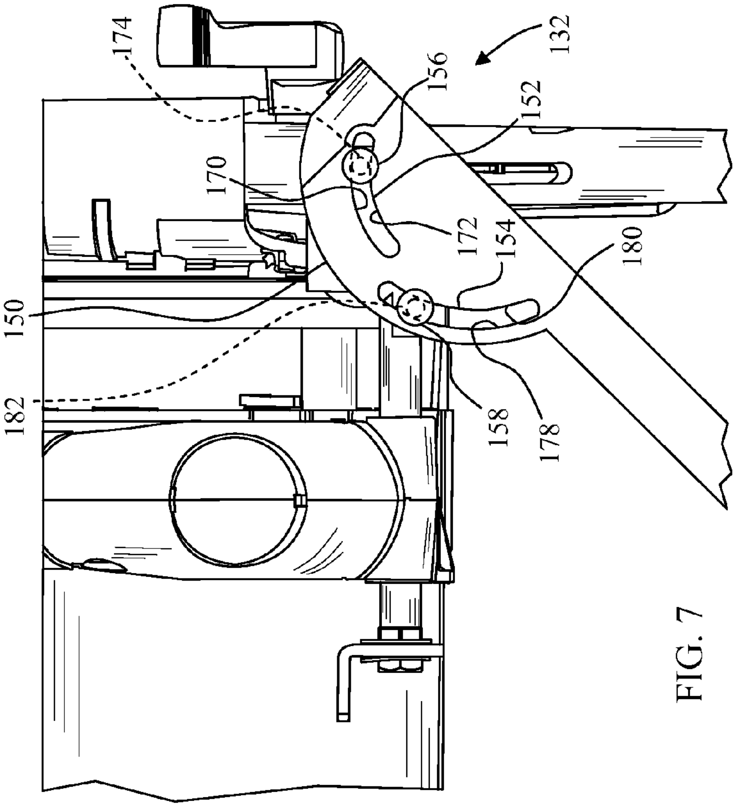
FIG. 7 depicts a partial rear plan view of the power tool of FIG. 1 showing two offset guide slots in the shape of arcs in a rear guide assembly used to pivotally support the upper portion of the tool of FIG. 1 above a foot structure when foot structure has been pivoted.

The user then pivots the foot structure 108 in a counterclockwise direction (as viewed in FIG. 4) until the desired angle is obtained between the plane defined by the bottom surface 120 of the foot structure 108 and the blade 112, such as the angle depicted in FIG. 7. Throughout the pivoting procedure, the foot structure 108 is supported stably by the front guide assembly 130 and the rear guide assembly 132. Stable support of the foot structure 108 is described with reference to FIG. 8.

Figure 8:
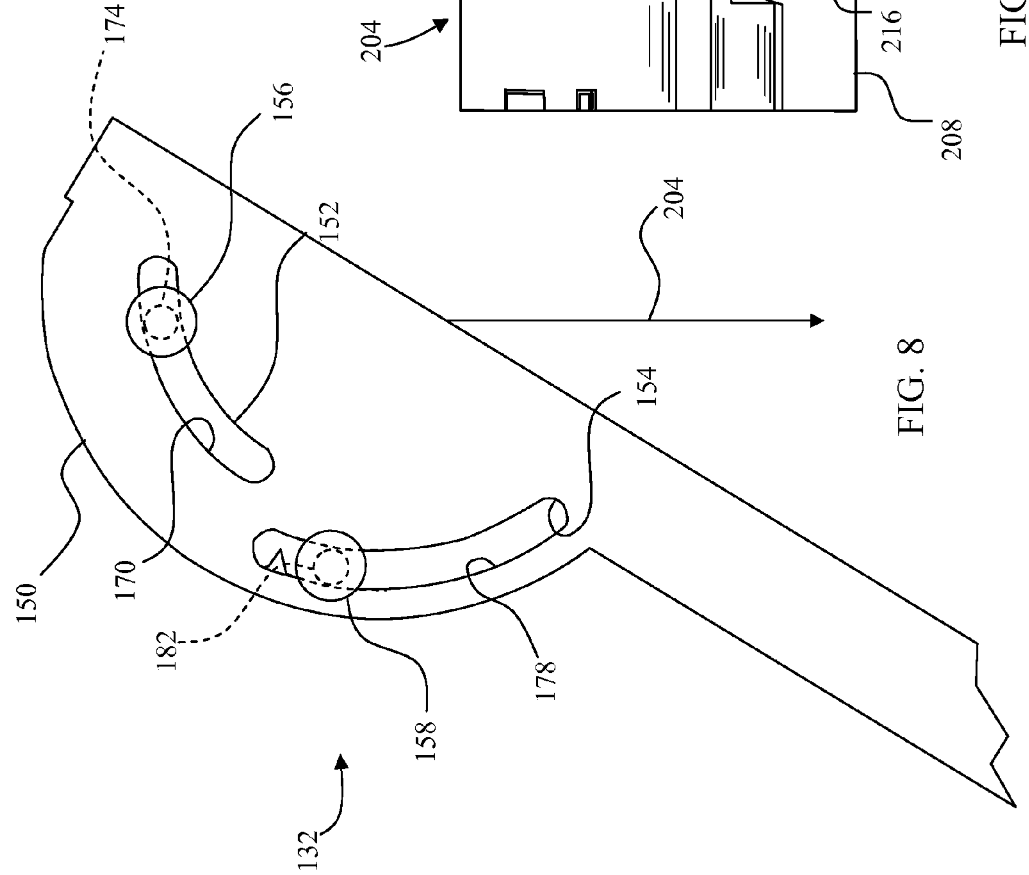
FIG. 8 depicts a simplified plan view of the rear guide assembly of FIG. 1 showing how the two pins provide stable support throughout pivoting of the foot structure of the tool of FIG. 1 below the upper portion of the tool.

FIG. 8 is a simplified view of the rear guide assembly 132. In FIG. 8, the direction of a force from the weight of the foot structure 108 is depicted by the arrow 204. The weight of the foot structure 108 thus tends to pull the foot structure 108 downwardly from the pin 158 since the upper wall 178 of the guide slot 154 is not fully supported by the upper part of the shaft 182 of the pin 158. The upper portion of the shaft 174 of the pin 156, however, is in contact with the upper wall 170 of the guide slot 152. Thus, while the pin 158 does not support the foot structure 108, the pin 156, along with the pin 142 of the front guide assembly 130, provides support for the foot structure 108. Moreover, at angles between the angle depicted in FIG. 4 and the angle depicted in FIG. 7, the pins 156 and 158 and guide slots 152 and 154 are configured such that lateral movement of either pin 156 or 158 within the respective guide slot 152 or 154 is directly opposed by the contact of the other of the pins 156 or 158 against the respective upper wall 170 or 178 of the respective guide slot 152 or 154. Thus, the foot structure 108 is supported stably by upper portion of the power tool 100 through the front guide assembly 130 and the rear guide assembly 132.

The front guide assembly 130 and the rear guide assembly 132 thus provide stable support for the upper portion of the tool 100 as well as the foot structure 108 throughout the range of pivoting allowed by the span of the guide slots 136, 138, 152, and 154. Since the upper walls and lower walls provide support, depending upon the particular manner in which the upper portion of the power tool 100 and the foot structure 108 are pivoted, the width of the guide slots 136, 138, 152, and 154 may be closely matched with the diameter of the shafts of the pins 140, 142, 156, and 158. In one embodiment, the shafts of the pins 140, 142, 156, and 158 are in simultaneous sliding contact with both the upper and lower walls of the associated guide slots 136, 138, 152, and 154 throughout the pivoting movement. Moreover, while the pins 140, 142, 156, and 158 are depicted as including cylindrically shaped shafts, guides with other shapes may be used, so long as the guides can move along the associated guide slots 136, 138, 152, and 154.

In the embodiment of FIG. 1, the guide slots 136, 138, 152, and 154 are offset with the radius 184 of the guide slots 136 and 154 longer than the radius 188 of the guide slots 138 and 152. The increased radius on the side of the front guide assembly 130 and the rear guide assembly 132 closer to the motor provides a mechanical advantage since the center of mass for the upper portion of the tool 100 will generally be on the side of the front guide assembly 130 and the rear guide assembly 132 closer to the motor. If desired, however, the radius of the guide slots could be reversed.

Figure 9:
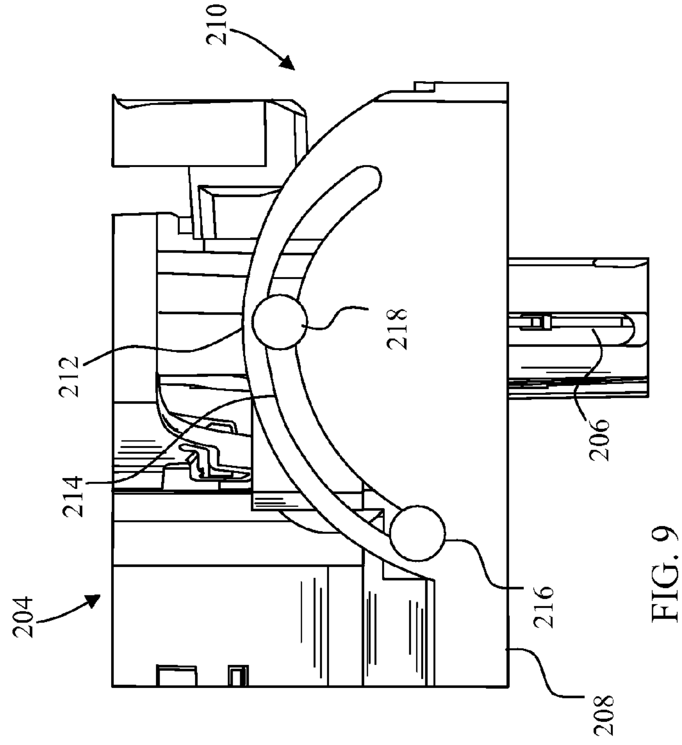
FIG. 9 depicts a partial rear plan view of a power tool showing two pins positioned within a single guide slot in the shape of an arc in a rear guide assembly used to pivotally support the upper portion of the tool above a foot structure.

Alternatively, more than one pin may be located in a guide slot. By way of example, FIG. 9 depicts a tool 204 with a blade 206, a foot structure 208, and a guide assembly 210. The guide assembly 210 includes a guide plate 212 with a single guide slot 214 and two pins 216 and 218. The guide slot 214 is configured such that when the pin 216 is nested at the left end portion of the guide slot 214, the foot support 208 is at a ninety degree angle with the blade 206. The guide slot 214 is further configured such that when the pin 218 is nested at the right end portion of the guide slot 214, the foot support 208 is at a maximum allowed angle with the blade 206.

Even though the pins 216 and 218 are in a single guide slot 214, the pins 216 and 218 are spaced apart along the guide slot 214 such that stable support is provided by the guide assembly 210 throughout pivoting. Additionally, the pin 218 is located on a plane defined by the blade 206 in the embodiment of FIG. 9 with about ninety degrees of separation between the pins 216 and 218 along the arc of the guide slot 214. In other embodiments, more than ninety degrees of separation may be provided between the pins 216 and 218.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power hand tool comprising:

a motor supported by a frame;

a foot including a front portion and a back portion, wherein the foot defines a first plane;

a blade disposed between the front portion and the back portion of the foot;
a first guide fixedly positioned with respect to the foot and defining a first arc in a second plane orthogonal to the first plane, the first arc having a first arc radius with a first arc origin;
a second guide fixedly positioned with respect to the foot and defining a second arc in a third plane orthogonal to the first plane, the second arc having a second arc radius with a second arc origin collocated with the first arc origin,
wherein the blade defines a cutting plane substantially orthogonal to the second plane and to the third plane and wherein the intersection of the cutting plane with the first plane defines a pivot axis, the first arc origin and the second arc origin being located at the pivot axis;
wherein the first guide and the second guide are offset with respect to one another with the first guide disposed at the front portion of the foot and the second guide disposed at the back portion of the foot;
a first pin fixedly positioned with respect to the motor and guided by the first guide; and
a second pin fixedly positioned with respect to the motor and guided by the second guide.

2. The power tool of claim 1, further comprising:
a first locking mechanism configured to fix the first pin with respect to the first guide.

3. The power tool of claim 1, further comprising:
a third guide fixedly positioned with respect to the foot and defining a third arc in the first plane;
a fourth guide fixedly positioned with respect to the foot and defining a fourth arc in the second plane;
a third pin fixedly positioned with respect to the motor and guided by the third guide; and
a fourth pin fixedly positioned with respect to the motor and guided by the fourth guide.

4. The power tool of claim 3, further comprising:
a second locking mechanism configured to fix the third pin with respect to the third guide.

5. The power tool of claim 1, wherein:
the first arc extends for about ninety degrees; and
the second arc extends for about ninety degrees.

6. The power tool of claim 1, wherein:
the first radius is greater than the second radius.

7. The power tool of claim 1, wherein:
the first pin is located at a first height above the first plane;
the first arc radius is about equal to the first height;
the second pin is located at a second height above the first plane; and
the second arc radius is larger than the second height.

8. A power hand tool comprising:
a motor supported by a frame;
a first pin fixedly positioned with respect to the motor;
a second pin fixedly positioned with respect to the motor;
a first guide plate in slidable contact with the first pin, the first guide plate pivotably connected to the frame through the first pin;
a foot structure defining a first plane, the foot structure rigidly connected to the first guide plate;
a blade of the tool defining a second plane, the second plane intersecting the first plane along a line;
a first guide slot slidably receiving the first pin, the first guide slot being an arced guide slot defined by a first radius of curvature having an origin on the line;
a second guide plate in slidable contact with the second pin, the second guide plate pivotably connected to the frame through the second pin;
a second guide slot slidably receiving the second pin, the second guide slot being an arced guide slot defined by a second radius of curvature having an origin on the line; wherein
the foot structure is rigidly connected to the second guide plate.

9. The power hand tool of claim 8, wherein;
the first pin has a first shaft with a first shaft diameter positioned within the first guide slot;
the first guide slot has a first guide slot wall and a second guide slot wall in opposition to the first guide slot wall;
the first guide slot wall and the second guide slot wall define a first guide slot width; and
the first guide slot width is substantially the same as the first shaft diameter such that the first shaft is in simultaneous contact with both the first guide slot wall and the second guide slot wall.

10. The power hand tool of claim 8, wherein a portion of the first pin is located in the second plane.

11. The power hand tool of claim 8, further comprising:
a third pin fixedly positioned with respect to the motor, wherein the first guide plate is in slidable contact with the third pin and the first guide plate is pivotably connected to the frame through the third pin.

12. The power hand tool of claim 11, wherein the second guide plate comprises:
a third guide slot slidably receiving the second pin; and
a fourth guide slot slidably receiving the fourth pin.

13. The power tool of claim 12, further comprising:
a locking mechanism configured to fix the first pin with respect to the first guide slot.

14. The power hand tool of claim 8, further comprising:
a third pin fixedly positioned with respect to the motor wherein the second guide plate is in slidable contact with the third pin and the second guide plate is pivotably connected to the frame through the third pin.

15. A power hand tool comprising:
a foot structure defining a planar support surface;
a first guide plate extending upwardly from the foot structure;
a first arcuate guide slot and a second arcuate guide slot in the first guide plate;
a first guide supported by the first arcuate guide slot;
a second guide supported by the second arcuate guide slot;
a second guide plate extending upwardly from the foot structure;
a third arcuate guide slot and a fourth arcuate guide slot in the second guide plate;
a third guide supported by the third arcuate guide slot;
a fourth guide supported by the fourth arcuate guide slot,
an upper portion of the tool pivotably supported by the foot structure through the first guide plate and the second guide plate, wherein the first guide, the second guide, the third guide, and the fourth guide are fixedly positioned with respect to the upper portion of the tool; and
a first bracket and a second bracket, wherein the first bracket supports the first guide and the second guide, both of which are fixedly positioned in the first bracket, and the second bracket supports the third guide and the fourth guide, both of which are fixedly positioned in the second bracket.

16. The power hand tool of claim 15, wherein:
the first guide includes a cylindrical shaft received within the first arcuate guide slot; and
the second guide includes a cylindrical shaft received within the second arcuate guide slot.

17. The power hand tool of claim 15, wherein:

the first arcuate guide slot is defined by a first radius;

the second arcuate guide slot is defined by a second radius;

the first radius is larger than the second radius;

the upper portion of the tool includes a motor;

the first arcuate guide slot is positioned in the first guide plate at a first location;

the second arcuate guide slot is positioned in the first guide plate at a second location; and the first location is closer to the motor than the second location.

18. The power tool of claim 15 wherein the first bracket is in slidable contact with the first guide plate and the second bracket is in slidable contact with the second guide plate.

* * * * *